US012369235B2

(12) United States Patent
Zhu et al.

(10) Patent No.: US 12,369,235 B2
(45) Date of Patent: Jul. 22, 2025

(54) LIGHT-EMITTING DIODE DRIVING DEVICE WITH ADJUSTABLE DIMMING DEPTH

(71) Applicant: KAISTAR Lighting(Xiamen) Co., Ltd., Xiamen (CN)

(72) Inventors: Xiao-Lei Zhu, Xiamen (CN); Yuan-Yuan Lin, Xiamen (CN); Sheng-Ju Chung, Xiamen (CN)

(73) Assignee: KAISTAR Lighting(Xiamen) Co., Ltd., Xiamen (CN)

( * ) Notice: Subject to any disclaimer, the term of this patent is extended or adjusted under 35 U.S.C. 154(b) by 98 days.

(21) Appl. No.: 18/230,906

(22) Filed: Aug. 7, 2023

(65) Prior Publication Data

US 2024/0107640 A1 Mar. 28, 2024

(30) Foreign Application Priority Data

Sep. 23, 2022 (CN) ......................... 202211163849.1

(51) Int. Cl.
*H05B 45/10* (2020.01)
*H05B 45/325* (2020.01)
*H05B 45/38* (2020.01)

(52) U.S. Cl.
CPC ........... *H05B 45/10* (2020.01); *H05B 45/325* (2020.01); *H05B 45/38* (2020.01)

(58) Field of Classification Search
CPC ...... H05B 45/10; H05B 45/325; H05B 45/38; H05B 45/3725; H05B 45/59; H05B 45/46; H05B 45/30
See application file for complete search history.

(56) References Cited

U.S. PATENT DOCUMENTS 11,849,517 B1 * 12/2023 Mignoli ................. H05B 45/44
2012/0074845 A1 * 3/2012 Aoki ...................... H05B 45/50 315/307

(Continued)

FOREIGN PATENT DOCUMENTS

CN 109068441 A 12/2018
EP 2440018 A1 4/2012

(Continued)

OTHER PUBLICATIONS

European Patent Office, Search Report issued on Dec. 22, 2023 for EP application No. 23195674.9.

*Primary Examiner* — Minh Tran
(74) *Attorney, Agent, or Firm* — Zhigang Ma

(57) ABSTRACT

An LED driving device with an adjustable dimming depth is provided. The LED driving device includes an LED driver and a dimming depth control circuit. The LED driver includes a dimming control circuit and a driving circuit. The dimming control circuit generates a first pulse-width modulation (PWM) signal according to a first brightness indication signal. The driving circuit drives a first light source and adjusts a brightness of the first light source. A duty ratio of the first PWM signal and the first driving current have a first relationship therebetween. The dimming depth control circuit includes a first variable resistance circuit, and the first variable resistance circuit controls a magnitude of a first variable resistance between a first current sampling terminal and a ground terminal according to a first dimming depth control signal. The first relationship defines a first dimming depth that varies with the first variable resistance.

11 Claims, 9 Drawing Sheets

(56) References Cited

U.S. PATENT DOCUMENTS

| | | | | |
|---|---|---|---|---|
| 2015/0061528 A1* | 3/2015 | Raval | H05B 45/38 |
| | | | 315/210 |
| 2022/0094153 A1* | 3/2022 | Archer | H02H 3/42 |

FOREIGN PATENT DOCUMENTS

| | | | |
|---|---|---|---|
| JP | 202261263 | A | 4/2022 |
| JP | 2022061263 | A | 4/2022 |
| WO | 2021175024 | A1 | 9/2021 |

* cited by examiner

LIGHT-EMITTING DIODE DRIVING DEVICE WITH ADJUSTABLE DIMMING DEPTH

CROSS-REFERENCE TO RELATED PATENT APPLICATION

This application claims the benefit of priority to China Patent Application No. 202211163849.1, filed on Sep. 23, 2022 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a light-emitting diode (LED) driving device, and more particularly to an LED driving device with an adjustable dimming depth.

BACKGROUND OF THE DISCLOSURE

In the existing dimming circuits, adjustment capabilities of dimming depths are limited, especially by the resolving capability of the driving circuit for the pulse-width modulation (PWM) signal. For example, the minimum dimming depth is usually limited to 1% to 5%, and the deeper the dimming depth and the lower the minimum dimming depth, the easier it is for issues relating to input signals not being able to be recognized (or to be recognized with accuracy) by the driving circuit to occur, which can cause the LED light source to flicker or go out entirely.

SUMMARY OF THE DISCLOSURE

In response to the above-referenced technical inadequacies, the present disclosure provides an LED driving device with an adjustable dimming depth, which can overcome limitations of the minimum dimming depth of 1% and address flicker issues.

In one aspect, the present disclosure provides an LED driving device with an adjustable dimming depth, and the LED driving device includes an LED driver and a dimming depth control circuit. The LED driver includes a dimming control circuit and a driving circuit. The dimming control circuit is configured to generate a first pulse-width modulation (PWM) signal according to a first brightness indication signal. The driving circuit is configured to drive a first light source to emit light with a first driving current, and adjust a brightness of the first light source according to the first PWM signal, a duty ratio of the first PWM signal and the first driving current have a first relationship therebetween, and the first light source is connected to the first current sampling terminal. The dimming depth control circuit includes a first variable resistance circuit connected between the first current sampling terminal and a ground terminal. The first variable resistance circuit is configured to control a magnitude of a first variable resistance between the first current sampling terminal and the ground terminal according to the first dimming depth control signal. The first relationship is used to define a first dimming depth of the first light source, and the first dimming depth varies with the first variable resistance.

Therefore, the LED driving device with the adjustable dimming depth provided by the present disclosure can break through the limitation of the minimum dimming depth, meet the requirement for dimming depth without increasing the demand on the resolving capability for the PWM signal, and address the flicker issues upon dimming. Moreover, the increase of the dimming depth can save more energy. Furthermore, the LED driving device with the adjustable dimming depth provided by the present disclosure can be further applied to most light bulbs and lamps that require a deep dimming function.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
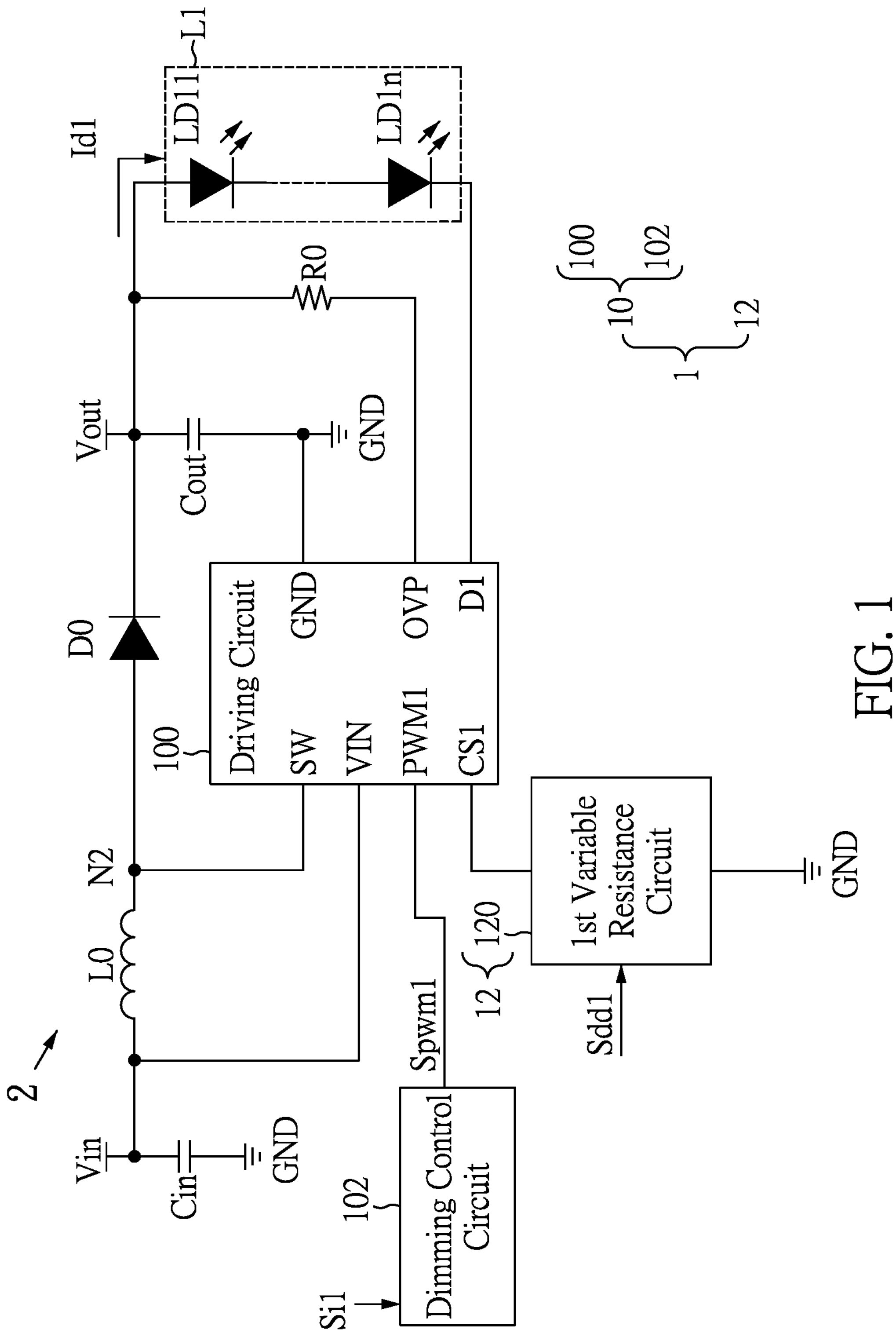
FIG. 1 is a schematic circuit diagram of an LED driving device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way.

Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
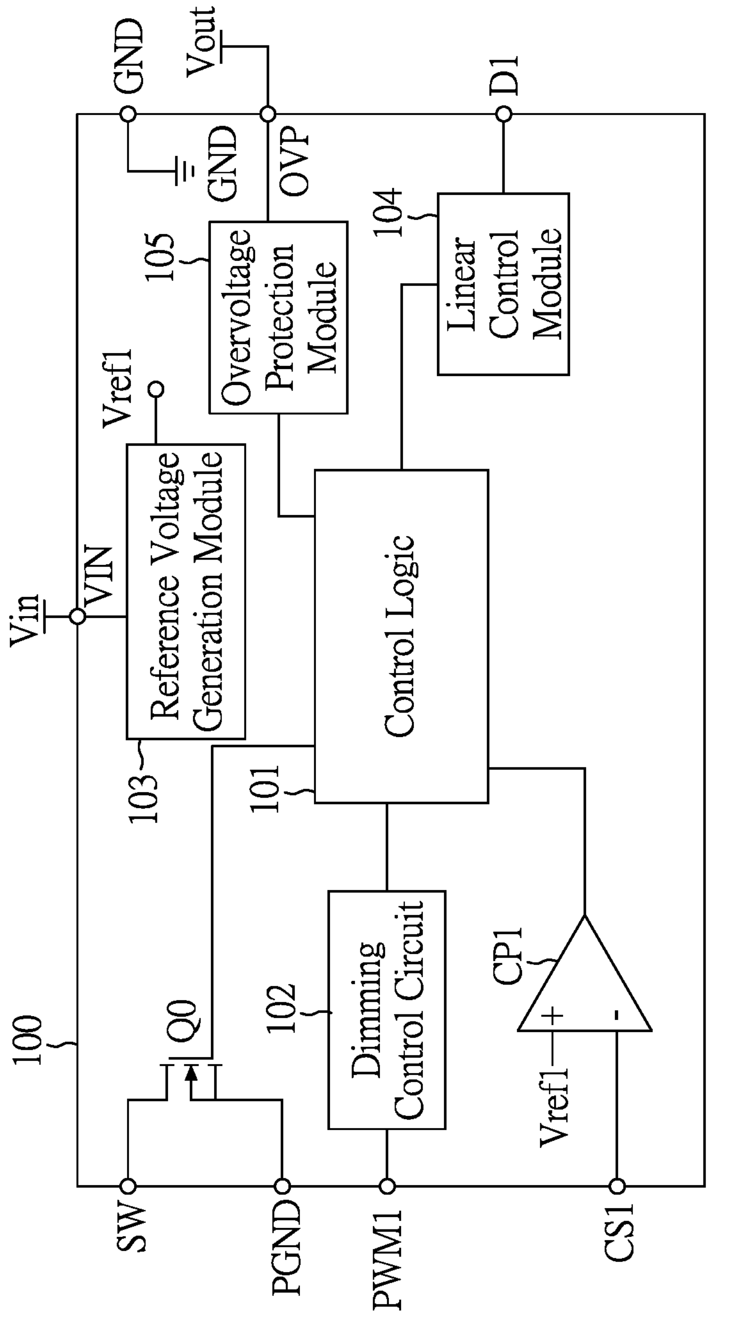
FIG. 2 is a schematic circuit diagram of the driving circuit according to the first embodiment of the present disclosure.

FIG. 1 is a schematic circuit diagram of an LED driving device according to a first embodiment of the present disclosure, and FIG. 2 is a schematic circuit diagram of the driving circuit according to the first embodiment of the present disclosure. Referring to FIG. 1, the first embodiment of the present disclosure provides an LED driving device 1 with an adjustable dimming depth. The LED driving device 1 can be, for example, an LED driving circuit that operates in a boost mode, and can be applied to a DC-DC boost converter 2 connected to an LED light source. The boost converter 2 includes at least an input capacitor Cin connected to an input voltage Vin, an inductor L0, a rectifier diode D0, an output capacitor Cout connected to an output voltage Vout, and a resistor R0. The input capacitor Cin and the output capacitor Cout are used for filtering, and the boost converter 2 charges the capacitor through a transistor Q0 in the LED driver 1 to boost the output voltage V0, and when the transistor Q0 is turned off, rectifications performed at a load-side allows the inductor L0 to discharge, so as to drive the first light source L1 to emit light. In some embodiments, a positive terminal of the first light source L1 is connected to the output voltage Vout, and the first light source L1 can include one or more LEDs, for example, LEDs LD11 to LD1*n*; however, the present disclosure does not limit a quantity of the LEDs in the first light source L1. It should be noted that the LED driving device 1 is not limited to an LED driving circuit operating in the boost mode. In other embodiments, the LED driving device 1 can also be an LED driving circuit operating in a buck mode, which can be applied to a DC-DC buck converter connected with an LED light source. Similar to the boost converter, the buck converter also relies on the inductor, diode, capacitor and internal transistor Q0 of the LED driving device 1 to regulate the output voltage, but the configuration of the buck converter is different from that of the boost converter, and a purpose of the buck converter is to reduce a DC input voltage to achieve a regulated low output voltage.

As shown in FIG. 1, the LED driving device 1 includes an LED driver 10 and a dimming depth control circuit 12. The LED driver 10 includes a driving circuit 100 and a dimming control circuit 102. The dimming control circuit 102 can be configured to generate a first PWM signal Spwm1 according to a first brightness indication signal Si1, and the driving circuit 100 can drive the first light source L1 to emit light through a first driving current Id1, and adjust a magnitude of the driving current Id1 according to the first PWM signal Spwm1, thereby controlling brightness of the first light source L1. The first brightness indicating signal Si1 can be input by a user, or can be triggered by an environment detection mechanism, and the present disclosure does not limit the generation and input methods of the first brightness indicating signal Si1.

As shown in FIGS. 1 and 2, in this embodiment, when viewed from the outside of the driving circuit 100, the driving circuit 100 has a switch input terminal SW, a voltage input terminal VIN, a first PWM signal receiving terminal PWM1, a first current sampling terminal CS1, a ground terminal GND, an overvoltage protection terminal OVP, and a first LED output terminal D1. The switch input terminal SW is connected to a node N2 between the inductor L0 and the rectifier diode D0, the voltage input terminal VIN is connected to the input voltage Vin, and the first PWM signal receiving terminal PWM1 is used to receive the first PWM signal Spwm1. The first current sampling terminal CS1 is connected to the first variable resistance circuit 120 of the dimming depth control circuit 12, and is electrically connected to the negative terminal of the first light source L1. The ground terminal GND is connected to the output capacitor Cout, and the overvoltage protection terminal OVP is connected to the output voltage Vout through the resistor R0, and the first LED output terminal D1 is connected to the negative terminal of the first light source L1.

Viewing the inside of the driving circuit 100, the driving circuit 100 further includes a transistor Q0, a control logic 101, a dimming control circuit 102, a reference voltage generation module 103, a linear control module 104, an overvoltage protection module 105 and a comparator CP1.

A first terminal of the transistor Q0 is connected to the switch input terminal SW, a second terminal of the transistor Q0 is connected to a chip ground terminal PGND, and a control terminal of the transistor Q0 is connected to the control logic 101. The control logic 101 can be configured to, based on the boost mode mentioned above and according to a magnitude of the obtained output voltage Vout and a magnitude of the first driving current Id1, turn the transistor Q0 on or off.

On the other hand, a first input terminal of the comparator CP1 is connected to the reference voltage generation module 103 for receiving a first reference voltage Vref1, a second input terminal of the comparator CP1 is connected to the first current sampling terminal CS1, and an output terminal of the comparator CP1 is connected to the control logic 101. The reference voltage generation module 103 is also connected to the voltage input terminal VIN for providing the first reference voltage Vref1, and the linear control module 104 is connected to a first LED output terminal D1.

Figure 3:
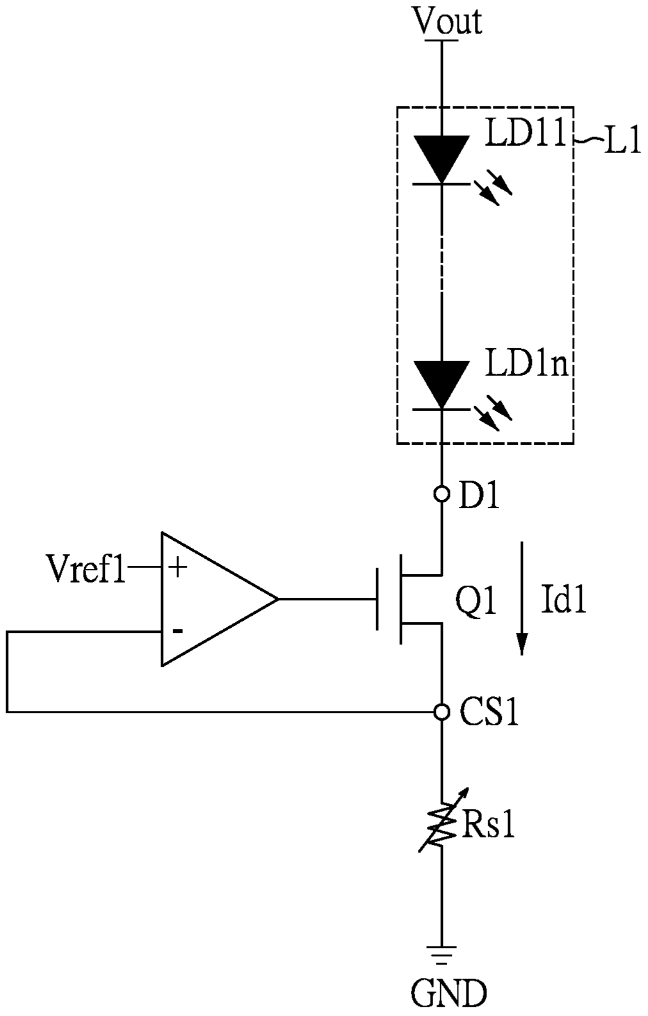
FIG. 3 shows a linear constant current control architecture according to the first embodiment of the present disclosure.

It should be noted that the reference voltage generation module 103, the linear control module 104 and the comparator CP1 can be jointly utilized to realize a linear constant current control scheme of the driving circuit 100. Reference is made to FIG. 3, which shows a linear constant current control architecture according to the first embodiment of the present disclosure. As shown in FIG. 3, the linear control module 104 can include a transistor Q1, a first terminal of which is connected to the first LED output terminal D1, a second terminal of which is connected to the first current sampling terminal CS1, and a control terminal of which is connected to the output terminal of the comparator CP1. A voltage at the second terminal of the transistor Q1 is fed back to the comparator CP1 for comparison, such that a voltage at the first current sampling terminal CS1 is kept constant at the first reference voltage Vref1, thereby making the first driving current Id1 passing through the first LED output terminal D1 constant.

In addition, in FIG. 3, the first variable resistance circuit 120 connected between the first current sampling terminal CS1 and the ground terminal GND is equivalent to a first variable resistor Rs1, and the magnitude of the first driving current Id1 can be adjusted by adjusting a resistance of the first variable resistor Rs1, as shown in the following equation (1):

$$Rs1 = \frac{Vref1}{I_{LED}}; \quad \text{equation (1)}$$

where $I_{LED}$ is an output average current.

In addition, the overvoltage protection module 105 is connected to an overvoltage protection terminal OVP. When the output voltage Vout rises above a voltage threshold, an open circuit protection can be triggered to disconnect a conductive path between the overvoltage protection terminal OVP and the control logic 101.

The dimming control circuit 102 is connected to the first PWM signal receiving terminal PWM1 for receiving the first PWM signal Spwm1 and performing analog dimming. In some embodiments, the dimming control circuit 102 can include a Delta-Sigma (ΔΣ) modulator circuit, an up-down counter and a digital-to-analog converter (DAC) to adjust the brightness of the first light source L1 according to a duty cycle of the first PWM signal Spwm1. In more detail, the duty cycle of the first PWM signal Spwm1 and the first driving current Id1 have a first relationship therebetween.

In the existing LED driving circuit, although the output current of the LED (1%~100%) can be adjusted correspondingly by adjusting the duty cycle of the PWM signal (for example, 1%~100%); however, the dimming depth varies with the duty cycle, while the minimum dimming depth is typically 1%. The reason is that when the duty cycle is less than 1%, such as 0.5%, the driving circuit has insufficient resolution capability for the PWM signal and fails to accurately identify the input signal. At this time, the driving circuit continuously turns the output current off and on repeatedly, which leads to the flickering of LED light. When the duty cycle of the PWM signal is less than 0.5%, such as 0.1%, it is more difficult for the driving circuit to recognize the input signal, and the output current will be cut off to turn off the LED light.

To this end, as shown in FIG. 1, a dimming depth control circuit 12 that can be adjusted according to a dimming depth requirement is further provided in the embodiment of the present disclosure. The dimming depth control circuit 12 includes the first variable resistance circuit 120 connected between the first current sampling terminal CS1 and the ground terminal GND, and the first variable resistance circuit 120 is configured to, according to the first dimming depth control signal Sdd1, control the resistance of the first variable resistor Rs1 between the current sampling terminal CS1 and the ground terminal GND.

It should be further noted that the duty ratio of the first PWM signal Spwm1 and the first driving current Id1 have a first relationship therebetween. For example, the duty ratio of 1% to 100% corresponds to 1% to 100% of the first driving current Id1, and the first relationship will be used to define a first dimming depth of the first light source L1, that is, to limit the first dimming depth in a range from 1% to 100%.

However, when the resistance of the first variable resistor Rs1 changes, the first dimming depth will be changed.

Figure 4:
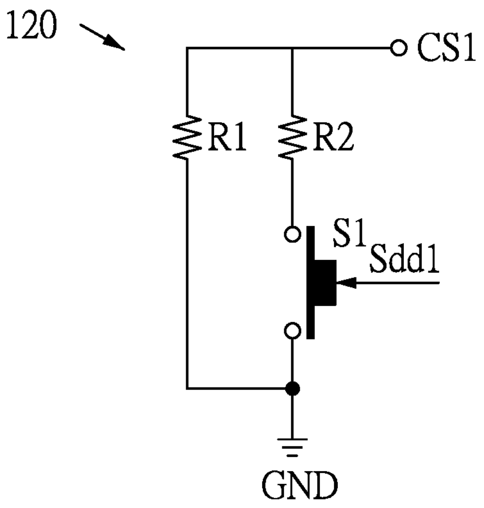
FIG. 4 is a schematic circuit diagram of a first variable resistor circuit according to the first embodiment of the present disclosure.

Reference is made to FIG. 4, which is a schematic circuit diagram of a first variable resistor circuit according to the first embodiment of the present disclosure.

As shown in FIG. 4, the first variable resistor circuit can include a first resistor R1, a second resistor R2 and a first switch circuit S1. The first resistor R1 is connected between the first current sampling terminal CS1 and the ground terminal GND. One terminal of the second resistor R2 is connected to the first current sampling terminal CS1. The first switch circuit S1 is connected between another terminal of the second resistor R2 and the ground terminal GND, and is controlled by the first dimming depth control signal Sdd1 to be switched between on and off. In this embodiment, the first switch circuit S1 may be, for example, a relay.

For example, a resistance of the first resistor R1 can be designed to be greater than a resistance of the second resistor R2. When the first switch circuit S1 is turned off, the resistance of the first variable resistor Rs1 is a first sampling resistance. When the switch circuit S1 is turned on, the resistance of the first variable resistor Rs1 is a second sampling resistance.

The following description relates to the dimming depth when the first switch circuit S1 is turned off. When the first driving current Ids1 is at 100%, the first driving current Ids1 is equal to a result of dividing the first sampling voltage Vcs by the first resistor R1 and then multiplied by 100%. At this time, the corresponding duty cycle of the first PWM signal Spwm1 is 100%.

Similarly, when the first driving current Ids1 is at 50%, the first driving current Ids1 is equal to a result of dividing the first sampling voltage Vcs by the first resistor R1 and multiplied by 50%. At this time, the corresponding duty cycle of the first PWM signal Spwm1 is 50%.

When the first driving current Ids1 is at 1%, the first driving current Ids1 is equal to a result of dividing the first sampling voltage Vcs by the first resistor R1 and then multiplied by 1%, at this time, the corresponding duty cycle of the first PWM signal Spwm1 is 1%.

However, a bottom limit of the PWM duty cycle is 1%, and the corresponding first dimming depth is 1% to 100%.

Next, a condition when the first switch circuit S1 is turned on is further considered. Assuming that in this embodiment, a resistance ratio of the first resistor R1 and the second resistor R2 is 1:0.01. When the first switch circuit S1 is turned on, an equivalent resistance of the first resistor R1 and the second resistor R2 that are connected in parallel is about 0.01 times the resistance of the first resistor R1.

Therefore, when the first switch circuit S1 is turned on, the first driving current Ids1 is equal to a result of dividing the first sampling voltage Vcs by 0.01 times the first resistor R1; at this time, compared to the condition when the first switch circuit S1 is turned off, the first driving current Ids1 is 100 times the previous first driving current Ids1 corresponding to the duty ratio is 100%. In other words, when the first switch circuit S1 is turned off, the brightness corresponding to a duty ratio of 1% to 100% will correspond to 0.01% to 1% of the brightness when the first switch circuit S1 is turned on.

Figure 5:
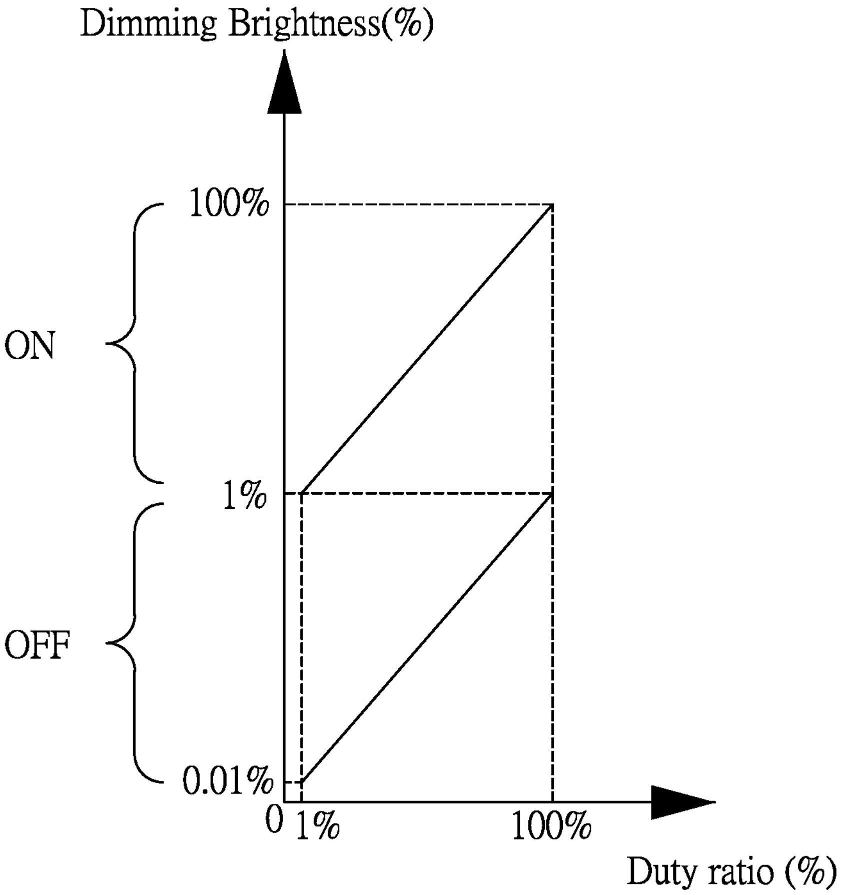
FIG. 5 is a plot diagram of the dimming brightness versus a duty cycle of the first PWM signal according to the first embodiment of the present disclosure.

Reference is made to FIG. 5, which is a plot diagram of the dimming brightness versus a duty cycle of the first PWM signal according to the first embodiment of the present disclosure. It can be seen from the above that when the first switch circuit S1 is turned on and the duty cycle of the first PWM signal Spwm1 is 100%, the maximum first driving current Ids1 can be obtained, which corresponds to the maximum brightness of 100%. Similarly, when the first switch circuit S1 is kept turned on and the duty cycle of the first PWM signal Spwm1 is adjusted to 1%, 1% of the maximum brightness can be obtained. Next, after the first switch circuit S1 is turned off, the resistance of the first variable resistor Rs1 reverts back to the resistance of the first resistor R1. To obtain the first driving current Ids corresponding to 1% of the maximum brightness, it is necessary to increase the duty cycle to 100%. Therefore, when the first switch circuit S1 is turned off and the duty ratio is 1%, 0.01% of the maximum brightness can be obtained.

That is to say, compared with the existing LED driving circuit without variable resistor design, the LED driving device with the adjustable dimming depth provided by the present disclosure can break through the limitation of the minimum dimming depth and meet the requirement for dimming depth without increasing the resolution capability for the PWM signal. Moreover, the increase of the dimming depth can save more energy.

It should be noted that in this embodiment, the first resistor R1 and the second resistor R2 can also be variable resistors, and based on the above descriptions, it can be seen that the first dimming depth varies with the resistance ratio of the first resistor R1 and the second resistor R2. However, in practice, the resistance of the first variable resistance circuit 120 is what mainly affects the dimming depth. That is, the first variable resistance of the first variable resistance circuit 120 needs to be controlled by the first dimming depth control signal Sdd1, so as to be switched between different resistances. For example, the first variable resistance can be switched between the first sampling resistance and the second sampling resistance, and the first sampling resistance can be greater than the second sampling resistance. Furthermore, the first sampling resistance and the second sampling resistance can also be designed according to requirements.

Optionally, a resistance ratio of the first sampling resistance and the second sampling resistance ranges from 1:0.5 to 1:0.01; therefore, when the resistance ratio of the first sampling resistance and the second sampling resistance is 1:0.5, the corresponding first dimming depth is 0.5% to 100%. When the resistance ratio of the first sampling resistance and the second sampling resistance is 1:0.01, the corresponding first dimming depth is 0.01% to 100%.

Figure 6:
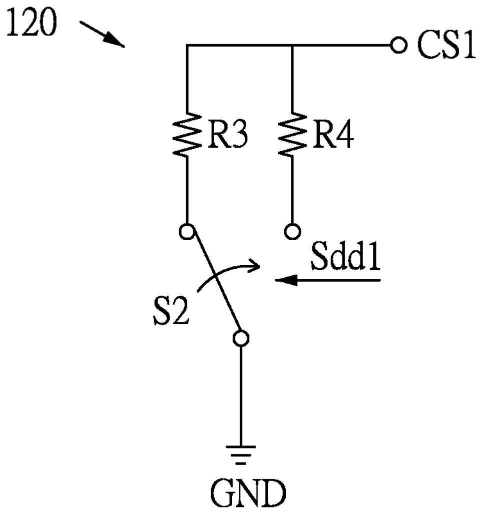
FIGS. 6 to 8 are other schematic circuit diagrams of the first variable resistance circuit according to the first embodiment of the present disclosure.
Figure 7:
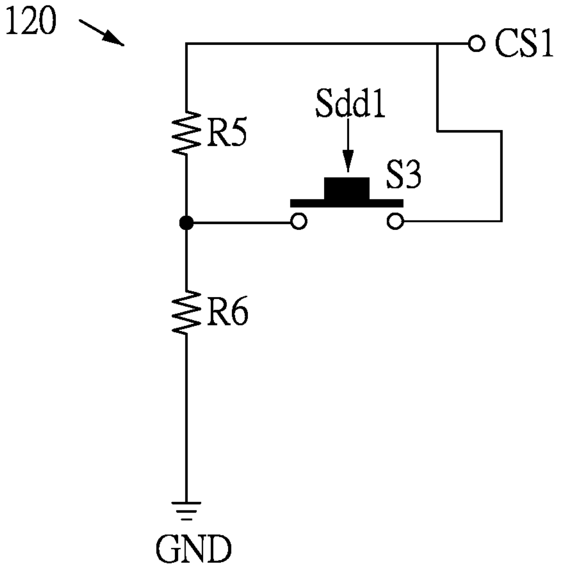
Figure 8:
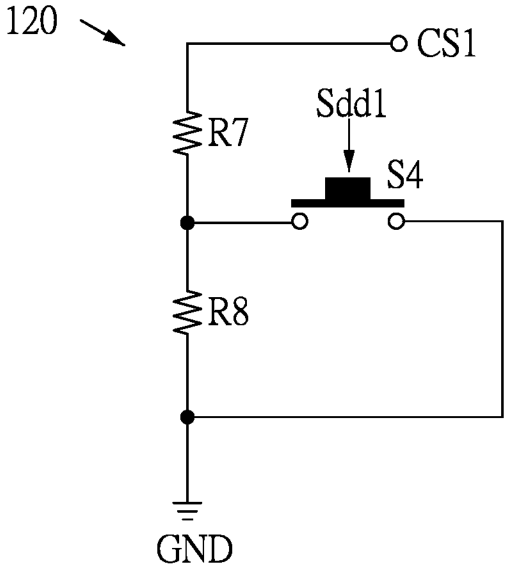

It should be noted that the present disclosure is not limited to the design of the variable resistor circuit shown in FIG. 4. Reference is made to FIGS. 6 to 8, which are other schematic circuit diagrams of the first variable resistance circuit according to the first embodiment of the present disclosure.

As shown in FIG. 6, in other embodiments, the first variable resistor circuit 120 can include a third resistor R3, a fourth resistor R4 and a second switch circuit S2. one terminal of the third resistor R3 is connected to the first current sampling terminal CS1, and one terminal of the fourth resistor R4 is connected to the first current sampling terminal CS1. The second switch circuit S2 has a first terminal, a second terminal and a third terminal, the first terminal is connected to another terminal of the third resistor R3, the second terminal is connected to another terminal of the fourth resistor R4, and the third terminal is connected to the ground terminal GND. The second switch circuit S2 is controlled by the first dimming depth control signal Sdd1 to selectively connect the third terminal to the first terminal or the second terminal. The first switch circuit S1 can be, for example, a single pole double throw (SPDT) switch.

A resistance of the third resistor R3 is greater than a resistance of the fourth resistor R4. When the third terminal is connected to the first terminal, the resistance of the first variable resistor Rs1 can be, for example, the aforementioned first sampling resistance, and when the third terminal is connected to the second terminal, the resistance of the first variable resistor Rs1 can be, for example, the aforementioned second sampling resistance. That is, the resistances of the third resistor R3 and the fourth resistor R4 can be equal to the first sampling resistance value and the second sampling resistance value, respectively. Therefore, a resistance ratio of the third resistor R3 and the fourth resistor R4 can optionally range from 1:0.5 to 1:0.01. Therefore, when the resistance ratio of the third resistor R3 and the fourth resistor R4 is 1:0.5, the corresponding first dimming depth is 0.5% to 100%, when the resistance ratio of the third resistor R3 and the fourth resistor R4 is 1:0.01, the corresponding first dimming depth is 0.01% to 100%.

In addition, as shown in FIG. 7, in other embodiments, the first variable resistor circuit 120 can include a fifth resistor R5, a sixth resistor R6 and a third switch circuit S3. One terminal of the fifth resistor R5 is connected to the first current sampling terminal CS1, and the sixth resistor R6 is connected between another terminal of the fifth resistor R5 and the ground terminal GND. The third switch circuit S3 is connected between the first current sampling terminal CS1 and the another terminal of the fifth resistor R5, and the third switch circuit S3 is controlled by the first dimming depth control signal Sdd1 to be switched between on and off. In this embodiment, the third switch circuit S3 can be, for example, a relay.

When the third switch circuit S3 is turned on, the first variable resistance (that is, a resistance of the sixth resistor R6) is the second sampling resistance value. When the third switch circuit S3 is turned off, the first variable resistance (that is, an equivalent resistance of the fifth resistor R5 and the sixth resistor R6 that are connected in series) is the first sampling resistance. Therefore, since the range of the resistance ratio of the first sampling resistance and the second sampling resistance is from 1:0.5 to 1:0.01, a range of a resistance ratio of the fifth resistor R5 and the sixth resistor R6 can optionally be from 1:1 to 99:1. When the resistance ratio of the fifth resistor R5 and the sixth resistor R6 is 1:1, the corresponding first dimming depth is 0.5% to 100%. When the resistance ratio of the fifth resistor R5 and the sixth resistor R6 is 99:1, the corresponding first dimming depth is 0.01% to 100%.

In addition, in other embodiments, the fifth resistor R5 and the sixth resistor R6 can also be variable resistors, and the first dimming depth will vary with the resistance ratio of the fifth resistor R5 and the sixth resistor R6.

Reference is made to FIG. 8, in other embodiments, the first variable resistance circuit 120 can include a seventh resistor R7, an eighth resistor R8 and a fourth switch circuit S4. One terminal of the seventh resistor R7 is connected to the first current sampling terminal CS1, and the eighth resistor R8 is connected between another terminal of the seventh resistor R7 and the ground terminal GND. One terminal of the fourth switch circuit S4 is connected between the seventh resistor R7 and the eighth resistor R8, another end of the fourth switch circuit S4 is connected between the eighth resistor R8 and the ground terminal GND, and the fourth switch circuit S4 is controlled by the first dimming depth control signal Sdd1 to be switched between on and off. In this embodiment, the fourth switch circuit S4 can be, for example, a relay.

When the fourth switch circuit S4 is turned on, the first variable resistance (that is, a resistance of the seventh resistor R7) is the second sampling resistance value. When the third switch circuit S3 is turned off, the first variable resistance (that is, an equivalent resistance of the seventh resistor R7 and the eighth resistor R8 that are connected in series) is the first sampling resistance.

Therefore, since the range of the resistance ratio of the first sampling resistance and the second sampling resistance is from 1:0.5 to 1:0.01, a range of a resistance ratio of the seventh resistor R7 and the eighth resistor R8 can optionally be from 1:1 to 99:1. When the resistance ratio of the seventh resistor R7 and the eighth resistor R8 is 1:1, the corresponding first dimming depth is 0.5% to 100%. When the resistance ratio of the seventh resistor R7 and the eighth resistor R8 is 99:1, the corresponding first dimming depth is 0.01% to 100%.

Therefore, the first variable resistance circuit in the embodiment of the present disclosure can have different implementations, and the purpose of increasing the dimming depth can be achieved by using different resistance combinations.

Second Embodiment

Figure 9:
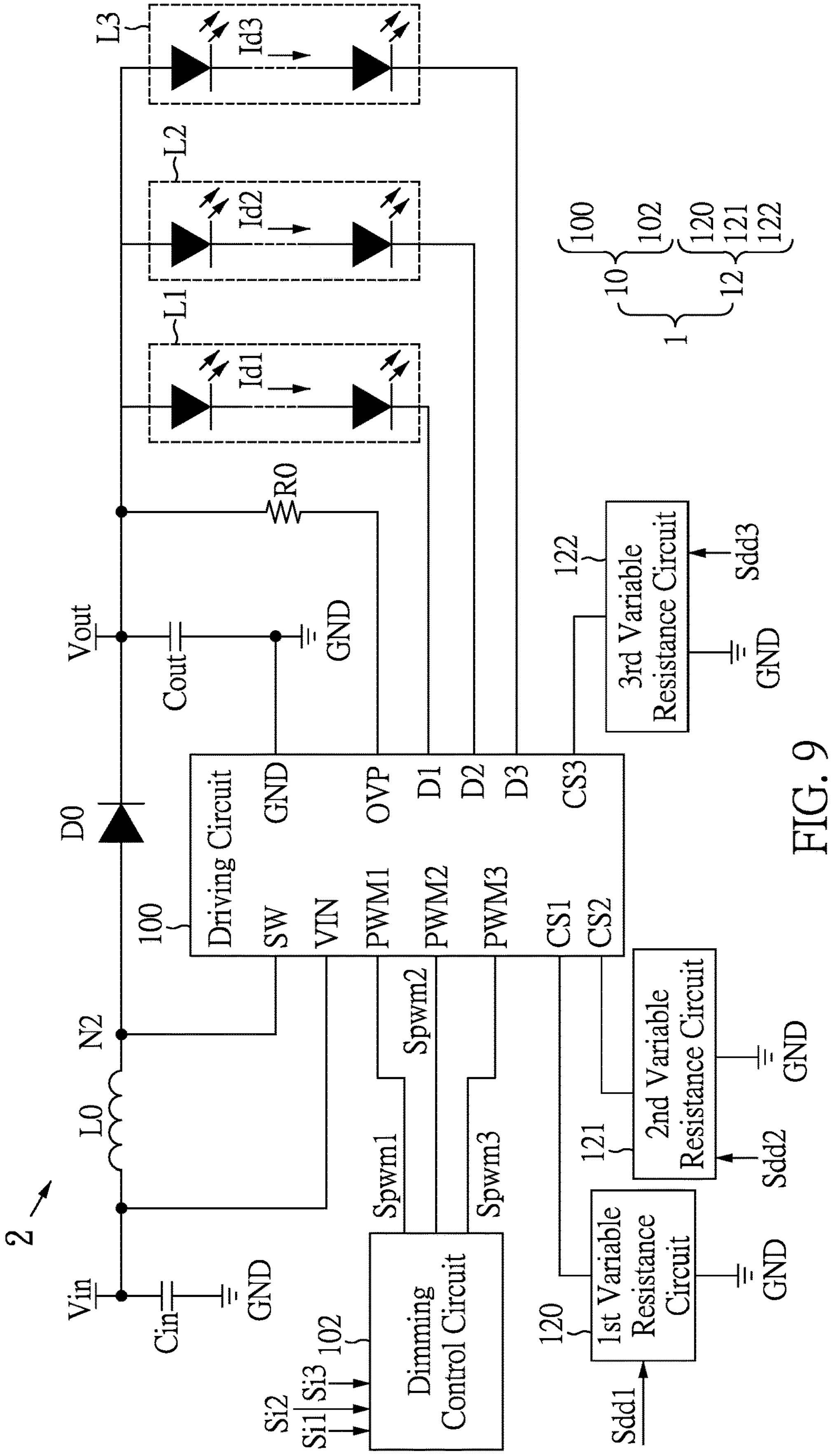
FIG. 9 is a schematic circuit diagram of an LED driving device according to a second embodiment of the present disclosure.

Reference is made to FIG. 9, which is a schematic circuit diagram of an LED driving device according to a second embodiment of the present disclosure. It should be noted that FIG. 9 provides an LED driving device 1 with adjustable dimming depth that is based on the embodiment in FIG. 1, and similar components are described with similar reference numerals such that repeated descriptions are omitted hereinafter.

The difference from the first embodiment is that the LED driving device 1 of the present embodiment is applied in a scheme with multiple light sources, and the multiple light sources can respectively represent light sources with different color temperatures or colors, and dimming depths of the multiple light sources can be independently controlled. Therefore, three light sources are taken as an example, but the present disclosure is not limited thereto.

Specifically, the dimming control circuit 102 further generates a second PWM signal Spwm2 and a third PWM signal Spwm3 according to a second brightness indicating signal Si2 and a third brightness indicating signal Si3, respectively, and the driving circuit 100 further drives the second light source L2 and the third light source L3 to emit light through the second driving current Id2 and the third PWM signal, respectively, and adjusts the brightness of the second light source L2 and the third light source L3 according to duty cycles of the second PWM signal Spwm2 and the third PWM signal Spwm3, respectively. Similarly, the duty ratio of the second PWM signal and the second driving current Id2 have a second relationship therebetween, a negative terminal of the second light source L2 is connected to the second current sampling terminal CS2, and the duty ratio of the third PWM signal Spwm3 and the third driving currents Id3 have a third relationship therebetween.

Similarly, the second brightness indicating signal Si2 and the third brightness indicating signal Si3 can be input by the user or triggered by an environment detection mechanism, and the present disclosure does not limit the generation and input methods of the second brightness indicating signal Si2 and the third brightness indicating signal Si3.

In this embodiment, the dimming depth control circuit 1 further includes a second variable resistance circuit 121 and a third variable resistance circuit 122.

The second variable resistance circuit 121 is connected between the second current sampling terminal CS2 and the ground terminal GND. The second variable resistance circuit 121 has a second variable resistance, and can be configured to control, according to the second depth control signal Sdd2, a magnitude of the second variable resistance between the second current sampling terminal CS2 and the ground terminal GND. The second relationship is used to define a second dimming depth of the second light source L2, and the second dimming depth varies with the second variable resistance.

Similarly, the third variable resistance circuit 122 is connected between the third current sampling terminal and the ground terminal, the third variable resistance circuit 122 has a third variable resistance, and is configured to control, according to the third depth control signal Sdd3, a magnitude of the third variable resistance between the third current sampling terminal CS3 and the ground terminal GND. The third relationship is used to define the third dimming depth of the third light source L3, and the third dimming depth can vary with the third variable resistance.

It should be noted that, in this embodiment, one or more of the first variable resistance circuit 120, the second variable resistance circuit 121 and the third variable resistance circuit 122 can adopt the circuit structures of the first variable resistance circuit 120 shown in FIGS. 4, 6, 7 and 8, and the corresponding variable resistances can also adopt the aforementioned ranges of the resistance ratios, so as to individually adjust the dimming depths of the first light source L1, the second light source L2 and the third light source L3 according to practical requirements. Since the principles for adjusting the dimming depth in the present disclosure has been described in detail above, they will not be repeated herein.

BENEFICIAL EFFECTS OF THE EMBODIMENTS

In conclusion, the LED driving device with the adjustable dimming depth provided by the present disclosure can break through the limitation of the minimum dimming depth, meet the requirement for dimming depth without increasing the resolution capability for the PWM signal, and address the dimming flicker issues. Moreover, the increase of the dimming depth can save more energy. Furthermore, the LED driving device with the adjustable dimming depth provided by the present application can be further applied to most light bulbs and lamps that require a deep dimming function.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A light-emitting diode (LED) driving device with an adjustable dimming depth, the LED driving device comprising:

an LED driver, including:

- a dimming control circuit configured to generate a first pulse-width modulation (PWM) signal according to a first brightness indication signal; and
- a driving circuit configured to drive a first light source to emit light with a first driving current, and adjust a brightness of the first light source according to the first PWM signal, wherein a duty ratio of the first PWM signal and the first driving current have a first relationship therebetween, and the first light source is connected to the first current sampling terminal; and a dimming depth control circuit, including:

a first variable resistance circuit connected between the first current sampling terminal and a ground terminal, and being configured to control a magnitude of a first variable resistance between the first current sampling terminal and the ground terminal according to the first dimming depth control signal, wherein the first relationship is used to define a first dimming depth of the first light source, and the first dimming depth varies with the first variable resistance;

wherein the first variable resistance circuit is configured to control the first variable resistance to be a first sampling resistance or a second sampling resistance according to the first dimming depth control signal, and a resistance ratio of the first sampling resistance to the second sampling resistance ranges from 1:0.5 to 1:0.01.

2. The LED driving device according to claim 1, wherein, when the resistance ratio of the first sampling resistance to the second sampling resistance is 1:0.5, the first dimming depth is 0.5% to 100%, and when the resistance ratio of the first sampling resistance to the second sampling resistance is 1:0.01, the first dimming depth is 0.01% to 100%.

3. The LED driving device according to claim 1, wherein the first variable resistance circuit includes:

a first resistor connected between the first current sampling terminal and the ground terminal;

a second resistor having one terminal connected to the first current sampling end; and a first switch circuit connected between another terminal of the second resistor and the ground terminal, wherein the first switch circuit is controlled by the first dimming depth control signal to be switched between on and off.

4. The LED driving device according to claim 3, wherein a resistance of the first resistor is greater than a resistance of the second resistor, and when the first switch circuit is turned on, the first variable resistance is the second sampling resistance, and when the first switch circuit is turned off, the first variable resistance is the first sampling resistance.

5. The LED driving device according to claim 3, wherein the first resistor and the second resistor are variable resistors, and the first dimming depth varies with a resistance ratio of the first resistor and the second resistor.

6. The LED driving device according to claim 1, wherein the first variable resistance circuit includes:

a third resistor having one terminal connected to the first current sampling terminal;

a fourth resistor having one terminal connected to the first current sampling terminal; and a second switch circuit having a first terminal, a second terminal and a third terminal, wherein the first terminal is connected to another terminal of the third resistor, the second terminal is connected to another terminal of the fourth resistor, the third terminal is connected to the ground terminal, and the second switch circuit is controlled by the first dimming depth control signal to selectively connect the third terminal to the first terminal or the second terminal;

wherein a resistance of the third resistor is greater than a resistance of the fourth resistor, when the third terminal is connected to the first terminal, the first variable resistance is the first sampling resistance, and when the third terminal is connected to the second terminal, the first variable resistance is the second sampling resistance.

7. The LED driving device according to claim 6, wherein the dimming control circuit further generates a second PWM signal according to a second brightness indication signal, the driving circuit is further configured to drive a second light source to emit light through a second driving current, and adjust a brightness of the second light source according to the second PWM signal, wherein a duty cycle of the second PWM signal and the second driving current have a second relationship therebetween, and the second light source is connected to the second current sampling terminal;

wherein the dimming depth control circuit further includes:

a second variable resistance circuit connected between the second current sampling terminal and another ground terminal, and being configured to control a magnitude of a second variable resistance between the second current sampling terminal and the another ground terminal according to the second dimming depth control signal, wherein the second relationship is used to define a second dimming depth of the second light source, and the second dimming depth varies with the second variable resistance.

8. The LED driving device according to claim 1, wherein the first variable resistance circuit includes:

a fifth resistor having one terminal connected to the first current sampling terminal;

a sixth resistor connected between another terminal of the fifth resistor and the ground terminal; and a third switch circuit connected between the first current sampling terminal and the another terminal of the fifth resistor, wherein the third switch circuit is controlled by the first dimming depth control signal to be switched between on and off;

wherein, when the third switch circuit is turned off, the first variable resistance is the first sampling resistance, and when the third switch circuit is turned on, the first variable resistance is the second sampling resistance.

9. The LED driving device according to claim 8, wherein the fifth resistor and the sixth resistor are variable resistors, and the first dimming depth varies with a resistance ratio of the first resistor and the second resistor.

10. An LED driving device with an adjustable dimming depth, the LED driving device comprising:

an LED driver, including:

a dimming control circuit configured to generate a first PWM signal according to a first brightness indication signal; and a driving circuit configured to drive a first light source to emit light with a first driving current, and adjust a brightness of the first light source according to the first PWM signal, wherein a duty ratio of the first PWM signal and the first driving current have a first relationship therebetween, and the first light source is connected to the first current sampling terminal; and a dimming depth control circuit, including:

a first variable resistance circuit connected between the first current sampling terminal and a ground terminal, and being configured to control a magnitude of a first variable resistance between the first current sampling terminal and the ground terminal according to the first dimming depth control signal, wherein the first relationship is used to define a first dimming depth of the first light source, and the first dimming depth varies with the first variable resistance;

wherein the first variable resistance circuit is configured to control the first variable resistance to be a first sampling resistance or a second sampling resistance according to the first dimming depth control signal, and the first sampling resistance is greater than the second sampling resistance; wherein the first variable resistance circuit includes:

a first resistor having one terminal connected to the first current sampling terminal;

a second resistor having one terminal connected to the first current sampling terminal; and a first switch circuit having a first terminal, a second terminal and a third terminal, wherein the first terminal is connected to another terminal of the first resistor, the second terminal is connected to another terminal of the second resistor, the third terminal is connected to the ground terminal, and the first switch circuit is controlled by the first dimming depth control signal to selectively connect the third terminal to the first terminal or the second terminal; and wherein a resistance of the first resistor is greater than a resistance of the second resistor, when the third terminal is connected to the first terminal, the first variable resistance is the first sampling resistance, and when the third terminal is connected to the second terminal, the first variable resistance is the second sampling resistance.

11. An LED driving device with an adjustable dimming depth, the LED driving device comprising:

an LED driver, including:

a dimming control circuit configured to generate a PWM signal according to a first brightness indication signal; and a driving circuit configured to drive a first light source to emit light with a first driving current, and adjust a brightness of the first light source according to the first PWM signal, wherein a duty ratio of the first PWM signal and the first driving current have a first relationship therebetween, and the first light source is connected to the first current sampling terminal; and a dimming depth control circuit, including:

a first variable resistance circuit connected between the first current sampling terminal and a ground terminal, and being configured to control a magnitude of a first variable resistance between the first current sampling terminal and the ground terminal according to the first dimming depth control signal, wherein the first relationship is used to define a first dimming depth of the first light source, and the first dimming depth varies with the first variable resistance;

wherein the first variable resistance circuit is configured to control the first variable resistance to be a first sampling resistance or a second sampling resistance according to the first dimming depth control signal, and the first sampling resistance is greater than the second sampling resistance;

wherein the first variable resistance circuit includes:

a first resistor having one terminal connected to the first current sampling terminal;

a second resistor connected between another terminal of the first resistor and the ground terminal; and a first switch circuit connected between the first current sampling terminal and the another terminal of the first resistor, wherein the first switch circuit is controlled by the first dimming depth control signal to be switched between on and off; and wherein, when the first switch circuit is turned off, the first variable resistance is the first sampling resistance, and when the first switch circuit is turned on, the first variable resistance is the second sampling resistance.

* * * * *